US011145447B2

(12) United States Patent
Kim

(10) Patent No.: US 11,145,447 B2
(45) Date of Patent: Oct. 12, 2021

(54) MAGNETO-RHEOLOGICAL ELASTOMER

(71) Applicants: Hyundai Motor Company, Seoul (KR); KIA Motors Corporation, Seoul (KR)

(72) Inventor: Young Min Kim, Siheung-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 72 days.

(21) Appl. No.: 16/682,779

(22) Filed: Nov. 13, 2019

(65) Prior Publication Data

US 2021/0020340 A1    Jan. 21, 2021

(30) Foreign Application Priority Data

Jul. 19, 2019    (KR) ........................ 10-2019-0087747

(51) Int. Cl.
| | |
|---|---|
| *C08K 3/34* | (2006.01) |
| *H01F 1/147* | (2006.01) |
| *C08K 13/04* | (2006.01) |
| *C08K 3/11* | (2018.01) |
| *H01F 1/28* | (2006.01) |
| *C08K 3/105* | (2018.01) |
| *H01F 1/26* | (2006.01) |

(52) U.S. Cl.
CPC ......... *H01F 1/14791* (2013.01); *C08K 3/105* (2018.01); *C08K 3/11* (2018.01); *C08K 3/34* (2013.01); *C08K 13/04* (2013.01); *H01F 1/26* (2013.01); *H01F 1/28* (2013.01)

(58) Field of Classification Search
CPC .......... H01F 1/28; H01F 1/26; H01F 1/14791; C08K 3/34; C08K 3/11; C08K 3/105; C08K 13/04; C08K 2201/014; C08K 2201/001; C08K 2201/002
USPC ....................................................... 252/62.54
See application file for complete search history.

(56) References Cited

U.S. PATENT DOCUMENTS

| | | | |
|---|---|---|---|
| 5,667,715 A * | 9/1997 | Foister | H01F 1/447 252/62.52 |
| 5,827,445 A * | 10/1998 | Yoshida | H05K 9/0083 252/62.54 |
| 6,183,657 B1 * | 2/2001 | Saito | H01F 1/24 148/104 |
| 2002/0198286 A1 * | 12/2002 | Igarashi | H01L 23/552 523/137 |
| 2005/0116194 A1 | 6/2005 | Fuchs et al. | |
| 2006/0099403 A1 * | 5/2006 | Johnson | H01L 23/3737 428/323 |
| 2007/0252104 A1 * | 11/2007 | Bose | H01F 1/447 252/62.54 |

(Continued)

FOREIGN PATENT DOCUMENTS

KR    10-2013-0067127 A    6/2013

*Primary Examiner* — Jane L Stanley
(74) *Attorney, Agent, or Firm* — Mintz Levin Cohn Ferris Glovsky and Popeo, P.C.; Peter F. Corless

(57) ABSTRACT

A magneto-rheological elastomer that can achieve weight reduction, maintain mechanical properties at an excellent level, and improve magnetic flux density. A magneto-rheological elastomer includes an elastomer base material as a matrix and sendust flakes and spherical sendust powders. The magneto-rheological elastomer is made by mixing the sendust flakes and the spherical sendust powders in the elastomer base material.

4 Claims, 4 Drawing Sheets

(56) References Cited

U.S. PATENT DOCUMENTS

| | | | |
|---|---|---|---|
| 2008/0318045 A1* | 12/2008 | Bose | H01F 1/375 |
| | | | 428/402 |
| 2011/0056593 A1* | 3/2011 | Lee | H01Q 17/002 |
| | | | 148/513 |
| 2012/0228018 A1* | 9/2012 | McBain | H05K 9/0083 |
| | | | 174/350 |
| 2016/0234981 A1* | 8/2016 | Do | C09K 5/14 |
| 2016/0247612 A1* | 8/2016 | Ebe | H01Q 7/06 |
| 2017/0053729 A1* | 2/2017 | Kotani | H01F 1/24 |

* cited by examiner

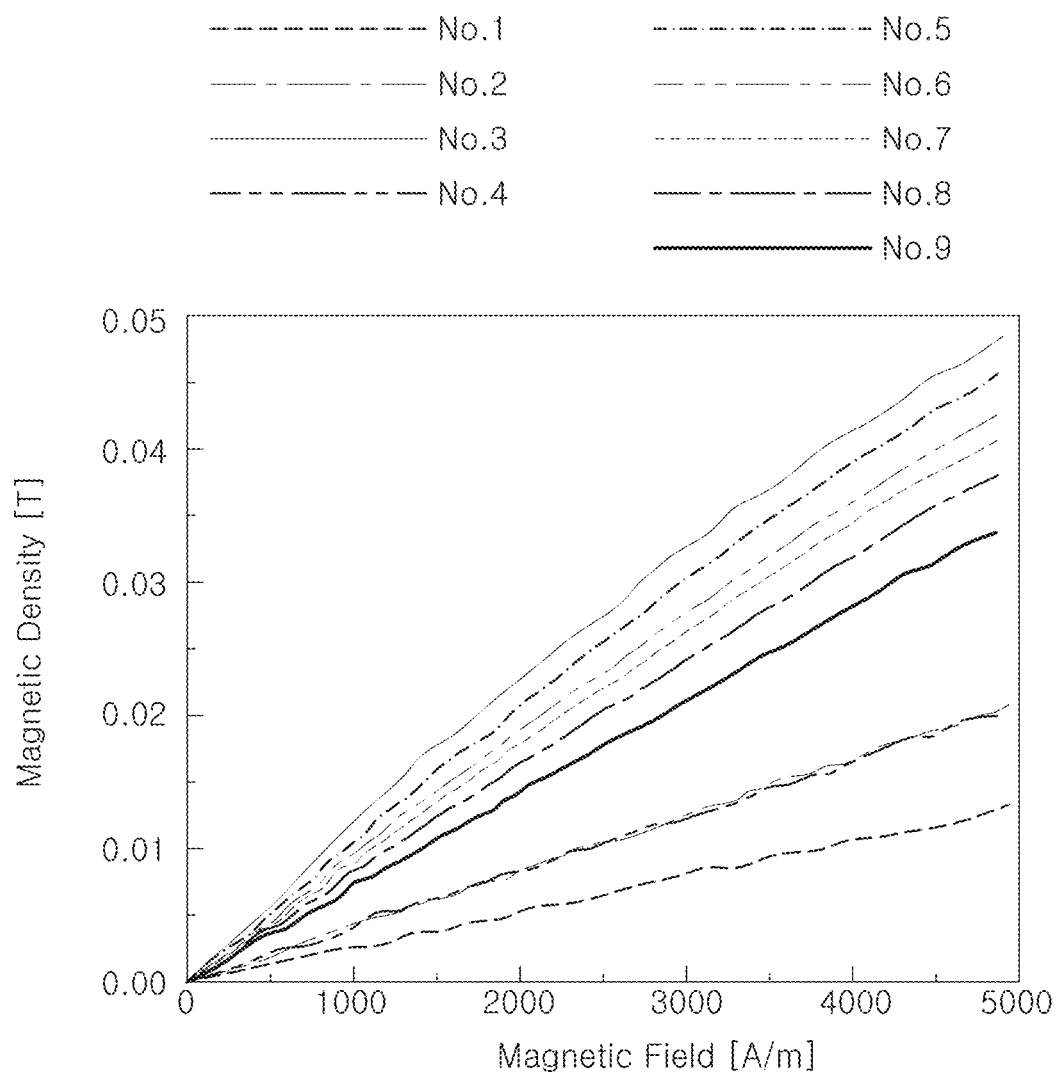

MAGNETO-RHEOLOGICAL ELASTOMER

CROSS-REFERENCE TO RELATED APPLICATION

This application claims the priority benefit of Korean Patent Application No. 10-2019-0087747, filed on Jul. 19, 2019 in the Korean Intellectual Property Office, the disclosure of which is incorporated herein by reference.

BACKGROUND

1. Field

The present disclosure relates to a magneto-rheological elastomer and, more particularly, to a magneto-rheological elastomer that can achieve weight reduction, maintain mechanical properties at an excellent level, and improve magnetic flux density.

2. Description of the Related Technology

A magneto-rheological (MR) material has rheological properties and dynamic properties that are changed by an external magnetic field. An MR fluid (MRF), an MR foam, and an MR Elastomer (MRE) are representative of the magneto-rheological material.

The disclosure of this section is to provide background information relating to the invention. Applicant does not admit that any information contained in this section constitutes prior art.

SUMMARY

The present disclosure provides a magneto-rheological elastomer that can achieve weight reduction by applying sendust, which is a magnetic responsive particle and has high magnetic permeability, maintain mechanical properties at an excellent level, and improve magnetic flux density.

Further, the present disclosure provides a magneto-rheological elastomer that can further improve a magnetic characteristic by applying anisotropy to the powder shape itself using sendust flakes.

A magneto-rheological elastomer according to an embodiment of the present disclosure may be made by mixing fragmentary sendust flakes and spherical sendust powders in an elastomer base material.

The amount of the sum of the sendust flakes and the sendust powder may be 30-150 PHR to the elastomer base material.

The mixture ratio of the sendust flakes and the sendust powders may have a value of 0:10 to 6:4.

The above-mentioned mixture ratio of the fragmentary sendust flakes and spherical sendust powders does not include a value of 0:10.

Specifically, the mixture ratio of the sendust flakes and the sendust powders may have a value of 0:10-4:6.

The elastomer base material may be natural rubber, and sendust alloy powders forming the sendust flakes and the sendust powders may comprise 9-10 wt % of Si, 4-8 wt % of Al, and a balance of Fe.

The sendust flakes are arranged in a predetermined direction.

Magnetic flux density of the magneto-rheological elastomer is 0.025 T (@4900 A/m) or more.

Tensile strength of the magneto-rheological elastomer is 150 Kgf/Ce or more.

Elongation of the magneto-rheological elastomer is 500% or more.

According to the present disclosure, a magneto-rheological elastomer that uses sendust, which is higher in magnetic permeability than a magneto-rheological elastomer using CIP particles as magnetic responsive particles, as magnetic responsive particles, is provided. Accordingly, it is possible to expect an effect that can maintain the same or higher mechanical properties and magnetic properties even though a small amount of sendust to the amount of CIP particles used in the magneto-rheological elastomer discussed above is used. Accordingly, it is possible to reduce the weight of the magneto-rheological elastomer.

Further, by using sendust as magnetic responsive particles, magnetic characteristics are improved, so response speed improvement of the magneto-rheological elastomer can be expected.

Further, sendust is used by mixing sendust flakes having a fragmentary shape and sendust powders having a spherical shape in accordance with shapes, so improvement of the mechanical properties of the magneto-rheological elastomer can be expected.

BRIEF DESCRIPTION OF THE DRAWINGS

The above and other aspects, features and advantages of the present disclosure will be more apparent from the following detailed description taken in conjunction with the accompanying drawings, in which:

FIG. 4 is a graph showing a change in magnetic flux density according to the mixture ratio of sendust flakes and sendust powder that are mixed in a magneto-rheological elastomer.

DETAILED DESCRIPTION OF EMBODIMENTS

Hereinafter, embodiments of the present disclosure are described in detail with reference to the accompanying drawings. However, the present disclosure is not limited to the following embodiments and can be implemented in various ways different from one another, and the embodiments are provided to complete the present disclosure and to completely inform those skilled in art of the scope of the present disclosure.

Magneto-rheological fluid has a fluid and particles in the fluid. Magneto-rheological fluid has limited usability because the particles settle during keeping. Thus, a specific container may be required to keep the matrix.

In some implementations, a magneto-rheological elastomer includes a matrix which is an elastomer. In particular, when a magnetic field is applied, an MRE changes in modulus and shows an MR effective, so an MRE can be used in many fields such as a damping part, a shock absorber, a noise block system, an insulator, and a magneto resistor sensor. In particular, applications of a magneto-rheological material to the field of manufacturing of automotive anti-vibration parts are further being studied.

In embodiments, spherical Carbonyl Iron Powder (CIP) may be used as soft magnetic powder particles for an MRE.

Figure 1:
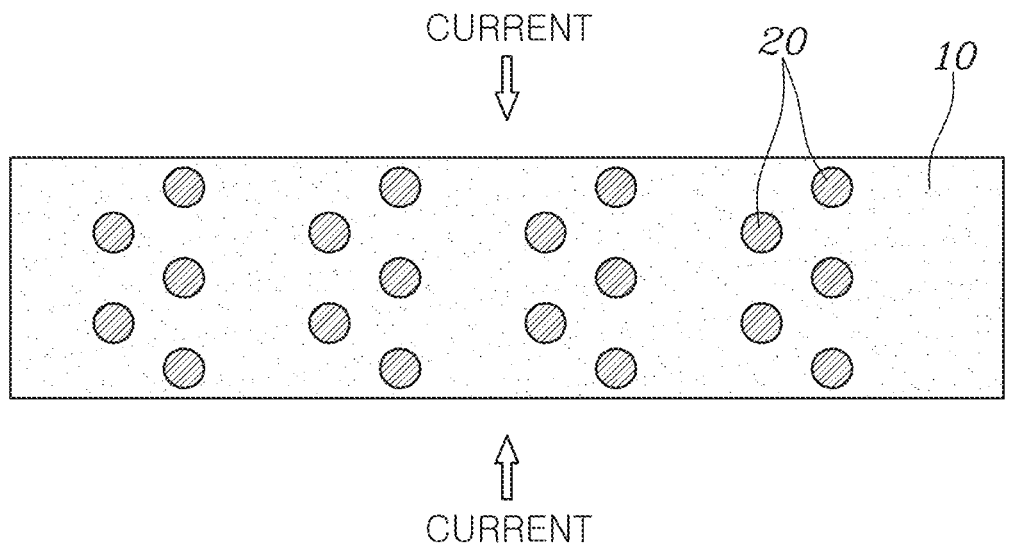
FIG. 1 illustrates an example of a magneto-rheological elastomer.

FIG. 1 illustrates an MRE according to an implementation of MRE technologies. As shown in FIG. 1, the MRE is made by mixing CIP particles 20 in an elastomer base material 10. In this configuration, a magnetic field is applied to the CIP powder 20 to improve the magnetic characteristic of the MRE, thereby applying anisotropy.

However, the CIP particles 20 have a limitation in improving reactivity of the MRE because the powder itself has low magnetic permeability. Further, there is also a limitation in improving the magnetic characteristic by applying anisotropy to the fine granular spherical CIP particles 20.

Figure 2:
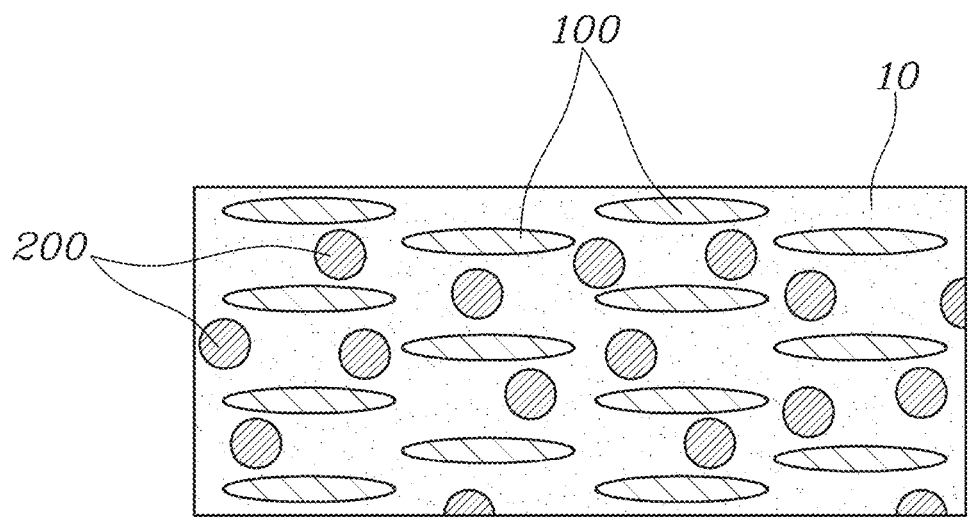
FIG. 2 illustrates a magneto-rheological elastomer according to an embodiment of the present disclosure.
Figure 3A:
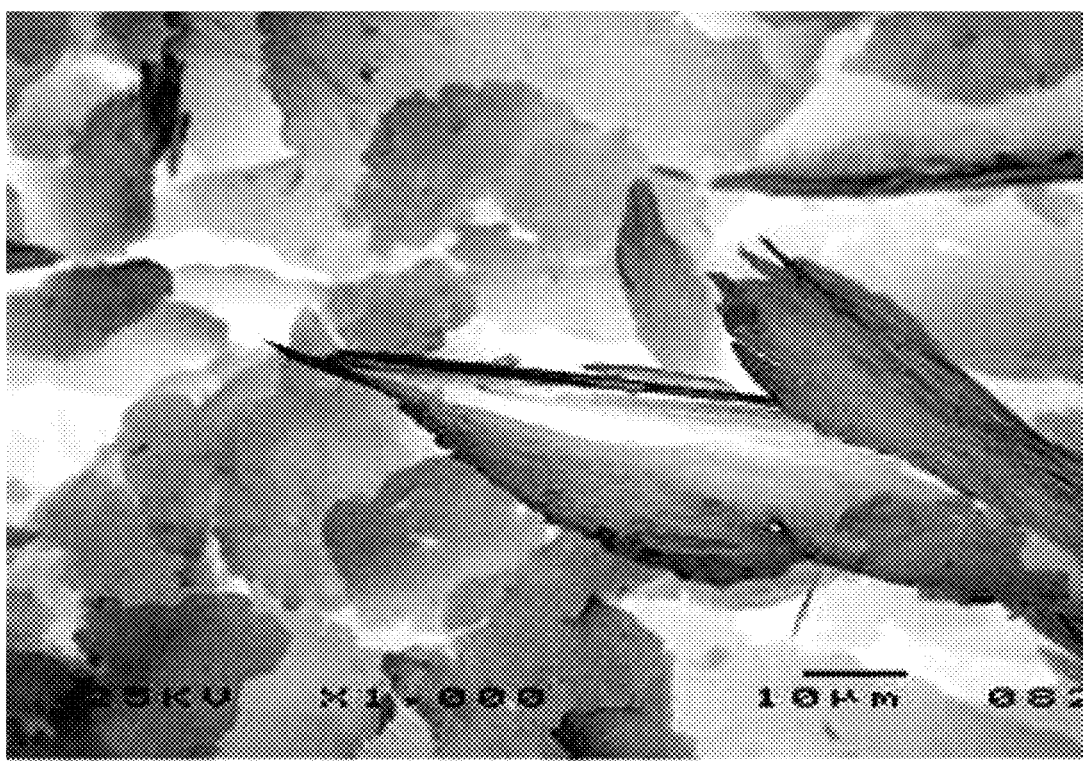
FIG. 3a is a picture showing sendust flakes that are mixed in a magneto-rheological elastomer according to an embodiment of the present disclosure.
Figure 3B:
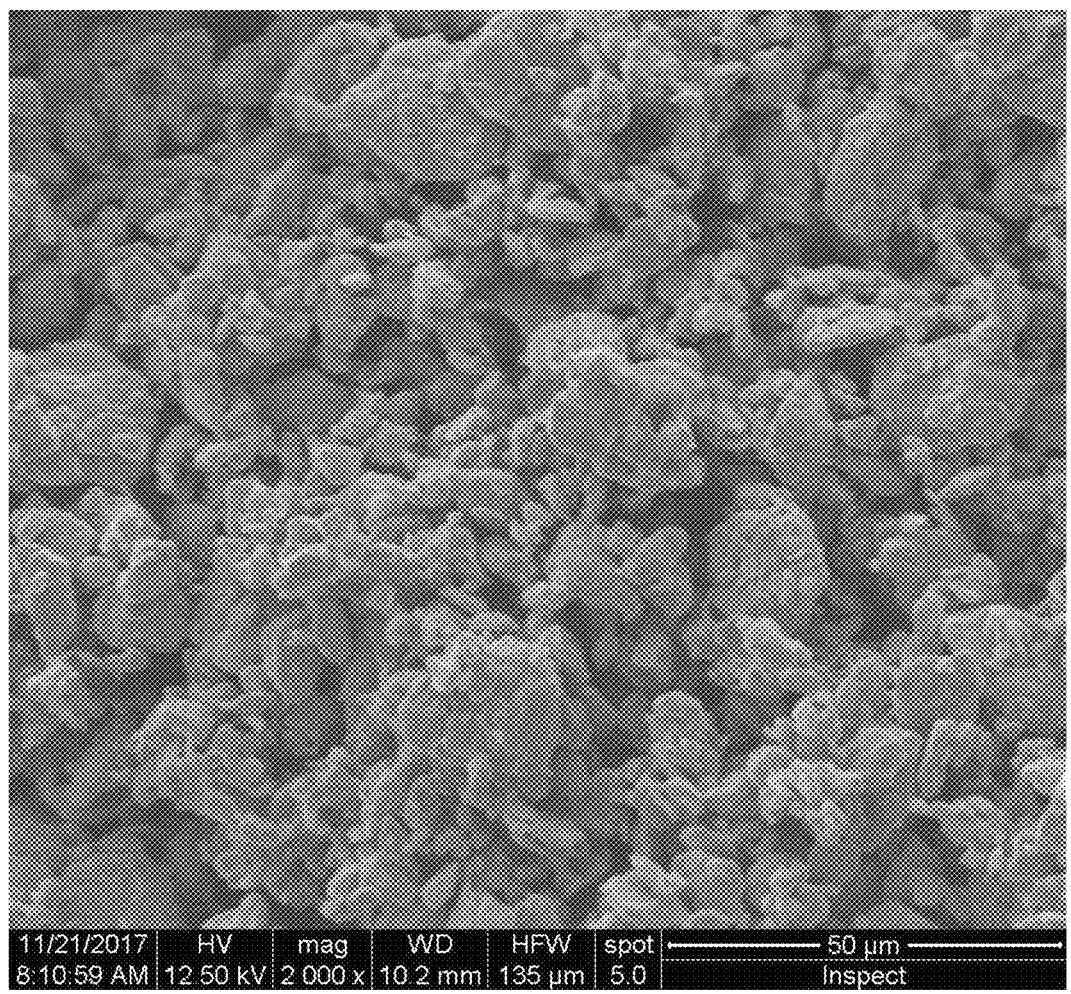
FIG. 3b is a picture showing sendust powders that are mixed in a magneto-rheological elastomer according to an embodiment of the present disclosure.

FIG. 2 illustrates a magneto-rheological elastomer according to an embodiment of the present disclosure, FIG. 3A is a picture showing sendust flakes that are mixed in a magneto-rheological elastomer according to an embodiment of the present disclosure, and FIG. 3B is a picture showing sendust powders that are mixed in a magneto-rheological elastomer according to an embodiment of the present disclosure.

As shown in FIG. 2, a magneto-rheological elastomer according to an embodiment of the present disclosure is formed by mixing a fragmentary sendust flakes 100 and spherical sendust powders 200 in an elastomer base material 10.

In embodiments, the sendust flakes 100, as can be seen from FIG. 3A, have generally planar or flat shapes. The sendust flake is thin such that the sendust flake have a thickness significantly smaller than its width. In some implementations, the sendust flakes have a thickness 0.1-1 μm while their width is 1-200 μm. In one implementation, the sendust flakes have a thickness 0.1-0.2 μm while their width is 40-150 μm. In one embodiment, the flakes may have generally flat and smooth surfaces.

In embodiments, the sendust flakes 100, as can be seen from FIG. 3A, are formed by making the sendust powders 200 into fragments to have anisotropy through milling using, for example, an attrition mill apparatus.

In embodiments, the sendust flakes are formed of the sendust powders 200. In some examples of making the sendust flakes, the sendust powders are rolled between two rolls into the flattened sendust flakes to have anisotropy. In one embodiment, the flakes are generally flat and may have smooth surfaces.

FIG. 3B is a picture of sendust powder, which shows that sendust powders have a spherical shape in one embodiment. In embodiments, the sendust powders are formed not necessarily in an accurate spherical shape, but in a substantially spherical shape. In embodiments, the sendust powders includes substantially spherical particles. In some implementations, the spherical particles have a diameter of 1-20 μm. In one implementation, the spherical particles have a diameter of 1-10 μm.

The sendust flakes and the sendust powders are arranged in a predetermined direction to give anisotropy. In particular, at least the sendust flakes naturally have anisotropy for the shape thereof.

Natural rubber may be used as the elastomer base material. Obviously, the material of the elastomer base material is not limited to natural rubber and various kinds of synthetic resin having elasticity can be used.

A Si—Al—Fe-based alloy is used for sendust alloy powders for making the sendust flakes and the sendust powders. For example, the sendust alloy powders are made of 9-10 wt % of Si, 4-8 wt % of Al, and a balance of Fe.

The sendust alloy powders are higher in magnetic permeability and specific resistance, as compared with CIP powders that have been used as magnetic responsive particles of the magneto-rheological elastomer illustrated in FIG. 1, so it can improve the magnetic characteristic of the magneto-rheological elastomer.

That is, CIP powders have magnetic permeability $\mu_0$ of around 500, but sendust allow powders have magnetic permeability $\mu_0$ of around 20,000. Accordingly, it is possible to improve the response speed and increase the magnetic flux density too of parts using a magneto-rheological elastomer by using sendust allow powders having relatively high magnetic permeability.

Meanwhile, the amount of the sum of the sendust flakes and the sendust powders may be 30-150 PHR to the elastomer base material. The PHR (Parts per Hundreds of Rubber) used herein is a unit that means weight of magnetic responsive particles that are added per weight of the elastic base material 100.

If the amount of the sum of the sendust flakes and the sendust powders is less than 30 PHR to the elastomer base material, the amount of magnetic sensitive particles may be too less, so it may be difficult to expect improvement of the magnetic characteristic, and when the amount of the sum of the sendust flakes and the sendust powders exceeds 150 PHR, the amount of magnetic sensitive particles may be too much, which may cause hardness to increase, and may cause tensile strength and elongation to decrease.

The mixture ratio of the sendust flakes and the sendust powders may have a value of 0:10-6:4. Since the magneto-rheological elastomer according to an embodiment of the present disclosure is formed by mixing the sendust flakes 100 and the sendust powders 200 in the elastomer base material 10, the mixture ratio of the sendust flakes 100 and the sendust powders 200 does not include a value of 0:10.

If the ratio of the sendust flakes increases more than the proposed mixture ratio, the magnetic flux density of the magneto-rheological elastomer may increase, but properties such as hardness, tensile strength, an elongation may be deteriorated. In particular, as for properties such as hardness, tensile strength, an elongation, when the mixture ratio of the sendust flakes 100 and the sendust powders 200 has a value of 0:10-6:4 as magnetic responsive particles of the magneto-rheological elastomer, it is possible to achieve properties similar to those when CIP powders of 150 PHR are used as magnetic responsive particles shown in FIG. 1, and more excellent properties can be achieved when the ratio has a value of 0:10-4:6.

Next, various kinds of specimens were prepared and the magnetic flux density of each specimen was measured to observe a change in magnetic flux density according to the mixture ratio of sendust flakes and sendust powders that are mixed in the magneto-rheological elastomer according to the present disclosure, using a comparative example and an embodiment, which is shown in FIG. 4.

FIG. 4 is a graph showing a change in magnetic flux density according to the mixture ratio of sendust flakes and sendust powders that are mixed in a magneto-rheological elastomer.

Prepared specimens are as in the following Table 1.

TABLE 1

| Item | Kind |
|---|---|
| No.1 | CIP 150 |
| No.2 | CIP 500 |

TABLE 1-continued

| Item | Kind |
|---|---|
| No.3 | SD 150 (F) |
| No.4 | SD 150 (P) |
| No.5 | SD 150 (F:P = 8:2) |
| No.6 | SD 150 (F:P = 6:4) |
| No.7 | SD 150 (F:P = 5:5) |
| No.8 | SD 150 (F:P = 4:6) |
| No.9 | SD 150 (F:P = 2:8) |

In table 1, the CIP means a mixture of CIP powders that are magnetic responsive particles, the SD means a mixture of sendust for magnetic responsive particles, and the numbers following CIP and SD mean the content (PHR) of magnetic responsive particles to an elastomer base material. Further, (F) means sendust flakes and (P) means sendust powders. Further, F:P means the content ratio of sendust flakes and sendust powders.

As can be seen from FIG. 4, it was possible to see that the magnetic characteristic is excellent when sendust flakes were mixed and used as magnetic responsive particles more than when CIP particles were used and when only sendust powders were used. In particular, it was possible to see that the higher the content of the sendust flakes, the more excellent the magnetic characteristic.

Further, it was possible to see that the magnetic flux density measured from the specimen in which the content ratio of the sendust flakes and the sendust powders had a value of 5:5 was 0.041 T (@4900 A/m) which was higher than 0.013 T (@4900 A/m) that was the magnetic flux density measured from the specimen containing CIP particles or 150 PHR.

Next, in order to observe changes in mechanical properties of a magneto-rheological elastomer according to mixture ratios of sendust flakes and the sendust powders that are mixed in the magneto-rheological elastomer, various kinds of specimens were prepared, and the hardness, tensile strength, and elongation of each specimen were measured and shown in Table 2.

TABLE 2

| Item | Hardness (Shore A) | Tensile strength (Kgf/cm²) | Elongation (%) |
|---|---|---|---|
| RUB 100 | 40 | 249.3 | 606 |
| CIP 150 | 47 | 179.4 | 539 |
| SD 150 (F:P = 10:0) | 68 | 100.8 | 430 |
| SD 150 (F:P = 6:4) | 56.3 | 163.4 | 519.3 |
| SD 150 (F:P = 5:5) | 53.6 | 175.3 | 537.8 |
| SD 150 (F:P = 4:6) | 51.4 | 184.1 | 552.0 |
| SD 150 (F:P = 3:7) | 49.7 | 189.6 | 562.1 |
| SD 150 (F:P = 2:8) | 48.4 | 192.4 | 567.8 |
| SD 150 (F:P = 0:10) | 48 | 186.9 | 567 |

In Table 2, similar to Table 1, RUB 100 means only natural rubber that is an elastomer base material was used without mixing magnetic responsive particles, CIP means that CIP powders were mixed as magnetic responsive particles, SD means that sendust was mixed as magnetic responsive particles, and the numbers following CIP and SD mean the contents (PHR) of magnetic responsive particles for the elastomer base material. Further, (F) means sendust flakes and (P) means sendust powders. Further, F:P means the content ratio of sendust flakes and sendust powders.

As can be seen from Table 2, it was possible to see that the higher the content of the sendust flakes, the higher the hardness of the magneto-rheological elastomer was slightly.

However, it was possible to see that the magneto-rheological elastomer having a high content of sendust powders relatively to the content ratio 6:4 of the sendust flakes and the sendust powders showed tensile strength and elongation similar to or higher than those of the magneto-rheological elastomer containing CIP particles of 150 PHR.

In particular, it was possible to see that the magneto-rheological elastomer having a high content of sendust powders relatively to the content ratio 4:6 of the sendust flakes and the sendust powders showed tensile strength and elongation higher than those of the magneto-rheological elastomer containing CIP particles of 150 PHR.

From this result, it is noted that the mixture ratio of the sendust flakes and the sendust powders may have a value of 0:10-6:4. Further, it is noted that the mixture ratio of the sendust flakes and the sendust powders, specifically, may have a value of 0:10-4:6.

As a result, as can be seen from the measurement result of FIG. 4 and Table 2, when the mixture ratio of sendust flakes and sendust powders is maintained in the range of 0:10-6:4 in accordance with an embodiment of the present disclosure, it is possible to maintain the magnetic flux density of the magneto-rheological elastomer higher than the magnetic flux density measured from the specimen containing CIP particles of 150 PHR. It is possible to maintain the magnetic flux density of a magneto-rheological elastomer at an excellent level of 0.025 T (@4900 A/m) or more.

Further, when the mixture ratio of sendust flakes and sendust powders is maintained in the range of 0:10-6:4 in accordance with an embodiment of the present disclosure, it is possible to maintain the tensile strength of the magneto-rheological elastomer at 150 Kgf/Ce or more. Further, when the mixture ratio of sendust flakes and sendust powders is maintained in the range of 0:10-4:6, it is possible to maintain the tensile strength of the magneto-rheological elastomer at 180 Kgf/Ce or more.

Further, when the mixture ratio of sendust flakes and sendust powders is maintained in the range of 0:10-6:4 in accordance with an embodiment of the present disclosure, it is possible to maintain the elongation of the magneto-rheological elastomer at 500% or more. Further, when the mixture ratio of sendust flakes and sendust powders is maintained in the range of 0:10-4:6, it is possible to maintain the elongation of the magneto-rheological elastomer at 550% or more.

Although the present disclosure was described above with reference to the accompanying drawings and embodiments, the present disclosure is not limited thereto, but is limited to the following claims. Accordingly, those skilled in the art may change and modify the present disclosure in various ways without departing from the spirit of the claims.

What is claimed is:

1. A magneto-rheological elastomer comprises:
   an elastomer base material; and
   sendust flakes and sendust powders dispersed in the elastomer base material, wherein the amount of the sum of the sendust flakes and sendust powders is 30-150 PHR to the elastomer base material, wherein a mixture ratio of the sendust flakes and sendust powders has a value of 0:10 to 6:4, wherein a case in which the mixture ratio of the sendust flakes and the sendust powders has a value of 0:10 is not include, wherein the sendust flakes comprise Si: 9-10 wt %, Al: 4-8 wt %, and a balance of Fe and the sendust powders comprise Si: 9-10 wt %, Al: 4-25 8 wt %, and a balance of Fe, wherein magnetic flux density of the magneto-rheological elastomer is 0.025 T at 4900 A/m or more, wherein tensile strength of the magneto-rheological elastomer is 150 Kgf/cm$^2$ or more, and wherein elongation of the magneto-rheological elastomer is 500% or more.

2. The magneto-rheological elastomer of claim 1, wherein the mixture ratio of the sendust flakes and sendust powders has a value of 0:10 to 4:6.

3. The magneto-rheological elastomer of claim 1, wherein the sendust flakes are arranged in a predetermined direction.

4. The magneto-rheological elastomer of claim 1, wherein the sendust flakes are generally flat and the sendust powders are generally spherical.

* * * * *